Figures 1, 2, 3:
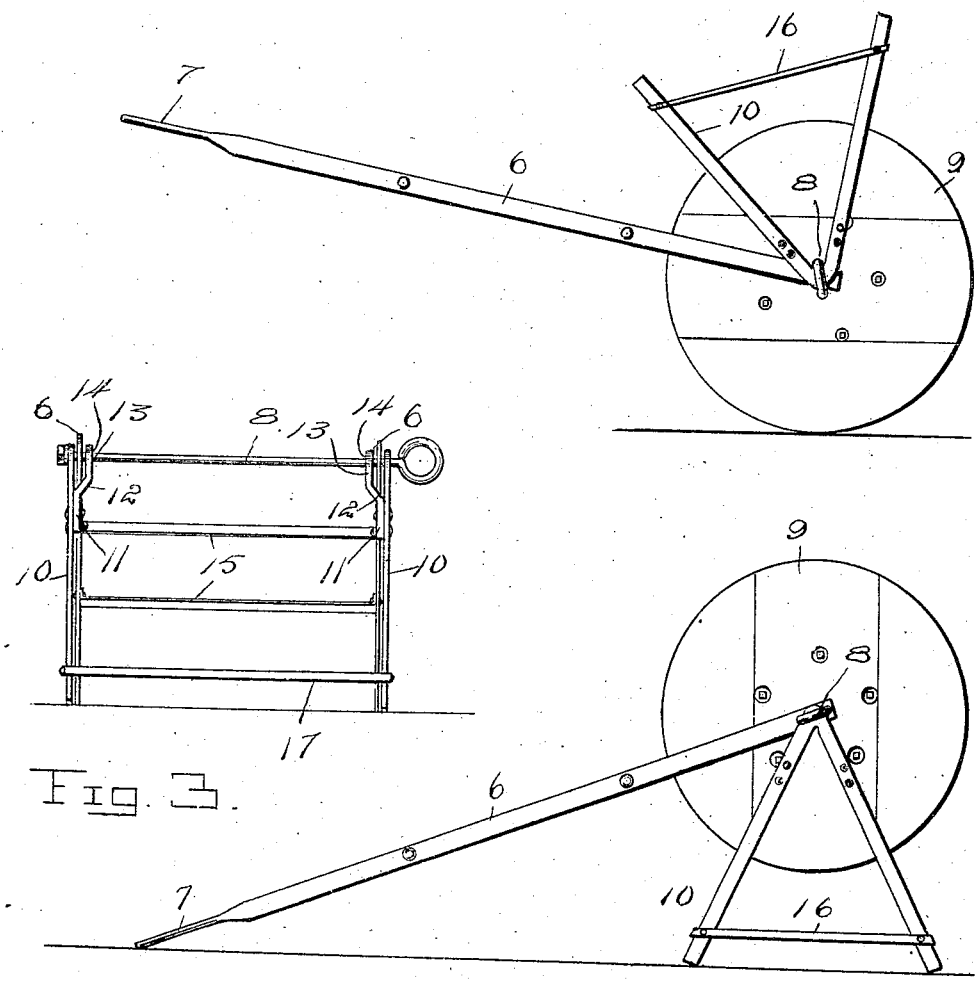

No. 848,932.

PATENTED APR. 2, 1907.

J. J. TELLINGTON.
REEL CARRIER.
APPLICATION FILED APR. 13, 1906.

2 SHEETS—SHEET 1.

Witnesses

Inventor
Jesse J. Tellington
By
Attorneys

No. 848,932. PATENTED APR. 2, 1907.
J. J. TELLINGTON.
REEL CARRIER.
APPLICATION FILED APR. 13, 1906.
2 SHEETS—SHEET 2.
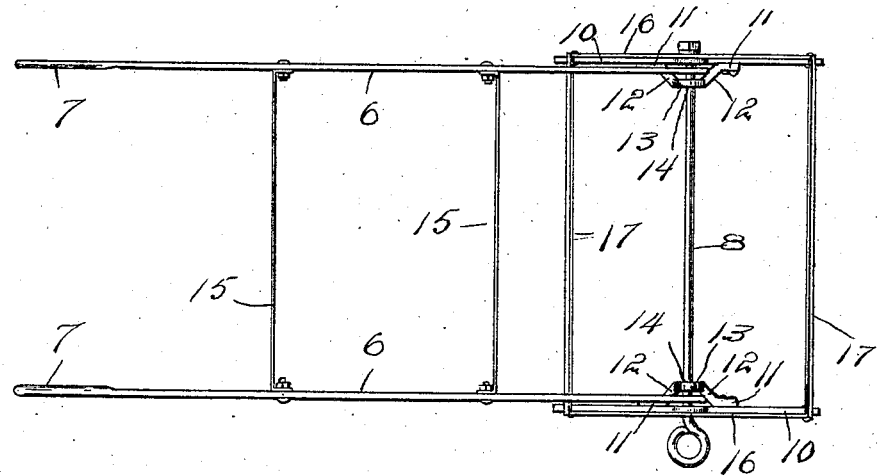
Fig. 4.
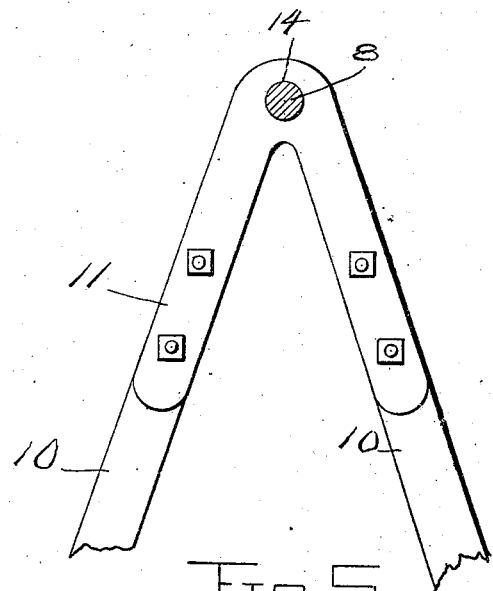
Fig. 5.
Witnesses
Inventor
Jesse J. Tellington.
By
Attorneys

UNITED STATES PATENT OFFICE.

JESSE J. TELLINGTON, OF BERLIN, NEW HAMPSHIRE.

REEL-CARRIER.

No. 848,932.　　　　Specification of Letters Patent.　　　Patented April 2, 1907.

Application filed April 13, 1906. Serial No. 311,568.

*To all whom it may concern:*

Be it known that I, JESSE J. TELLINGTON, a citizen of the United States, residing at Berlin, in the county of Coos, State of New Hampshire, have invented certain new and useful Improvements in Reel-Carriers; and I do hereby declare the following to be a full, clear, and exact description of the invention, such as will enable others skilled in the art to which it appertains to make and use the same.

This invention relates to reel-carriers, and refers more particularly to carriers for the reel of wire used in the line construction of electrical work.

The object of the invention is to provide a reel of the above class which shall be simple of construction and easy of operation, which shall have all of its parts readily separable, and which shall be in general a more effective and desirable device of this character than is now in use.

A particular object of the invention is to provide a reel-carrier having a pair of supports attached to the carrier-frame and inoperative when the reel is being moved from one place to another, but which can be unlocked to firmly support the reel above the level of the ground when in use, so that it can be rotated in one direction or the other.

A further object consists in so locating the supports upon the reel-frame that they may be held in place thereon when the device is to be moved and which when so held will be out of the way of the frame-handles and will occupy but little space thereon.

A still further object is to so construct the device that it will not be necessary to reverse the entire reel-frame when the device is changed from its operative and inoperative position.

The invention will be more readily understood from a consideration of the drawings forming a part of the specification, and in which the same parts are referred to by the same numerals.

In the drawings, Figure 1 shows a side elevation of my improved reel-carrier with the supports held upon the frame and the device in position to be moved. Fig. 2 is a similar view showing the supports in operative position. Fig. 3 is an end view of Fig. 2, the reel being removed from the carriers. Fig. 4 is a top plan view of Fig. 2. Fig. 5 is a side elevation, on an enlarged scale, of one of the brackets of the supports.

Referring to the drawings, the reel-frame is composed of a pair of sills 6 6, provided at their rear ends with handle portions 7 7. The front ends of the sills 6 are provided with perforations through which passes a bolt 8, carrying the reel 9, upon which the wire is wound. The reel is of the ordinary construction, consisting of the usual pair of heads and connected cross-pieces, forming the core thereof. Pivoted on the bolt 8, outside of each head, is a V-shaped reel-support 10, each member of which is of approximately the same width as that of the sill 6. Attached to the inner side of each support by bolts or other preferred means and adjacent the apex thereof is a bracket 11 of similar shape, with the upper portion thereof bent outwardly, as at 12, and then parallel with the support side, as at 13. Each support and bracket is perforated, as at 14, at its apex, the several perforations alining to permit the bolt 8 to pass therethrough, one end of said bolt being formed with a handle portion, while its opposite end is provided with a nut threaded thereon, by means of which the reel and its supports are retained in place thereon. The sills 6 are braced together by a pair of cross-pieces 15, while each support has a similar brace 16, the supports being connected together and further strengthened by the braces 17, the several braces being secured to the sills and supports by bolts or in any other preferred manner. The material of the frame, reel, and supports may be wood or metal, as desired.

When it is desired to move the carrier from one place to another, it is only necessary to swing the supports 10 upwardly upon bolt 8 to the position shown in Fig. 1, when the brackets 11, attached to the supports, will rest upon the sills 6 and be retained in place thereon. The entire device may then be moved in wheelbarrow fashion to the place where the wire is to be used, when the reel is elevated slightly above the ground and the supports moved from their position upon the sills and allowed to assume the position shown in Fig. 2, with their lower ends upon the ground, when the reel is then lowered and will be held firmly in place upon the supports. The reel can then be freely rotated in either direction to wind or unwind the wire thereon.

Throughout the specification the term "operative position" is used to denote the position of the reel when it may be rotated and the wire wound or unwound therefrom, and the term "inoperative position" in like manner refers to the position of the device in which the supports are retained in place upon the sills and the entire device is adapted to be moved from one place to another.

What is claimed is—

1. A reel-carrier comprising a pair of sills, a bolt at the front ends thereof adapted to carry a reel; V-shaped supports pivoted to said bolt for supporting the reel when in one position; and means for retaining said V-shaped supports upon the sills when the reel is in its second position.

2. A reel-carrier comprising a pair of sills, a bolt at the front ends thereof adapted to carry a reel; V-shaped supports pivoted at their upper ends to each end of said bolt for supporting the reel when in one position; and a bracket attached to the inner face of each support; said brackets having alining perforations through which said bolt passes.

3. A device of the kind described comprising in combination, a reel composed of a pair of heads and connecting cross-pieces; a carrier for said reel comprising a pair of sills; a bolt passing through the front end of said sills and said heads; V-shaped supports pivoted at their upper ends to each end of said bolt exterior of said sills for supporting the device in operative position; and a bracket attached to the inner side of each support; said brackets being adapted to retain said supports in place upon the sills when the device is in an inoperative position.

In testimony whereof I affix my signature in presence of two witnesses.

JESSE J. TELLINGTON.

Witnesses:
   WM. H. PAINE,
   D. J. WEARE.